(12) United States Patent
Luther et al.

(10) Patent No.: US 9,925,480 B2
(45) Date of Patent: Mar. 27, 2018

(54) END CAP RETENTION DEVICE

(75) Inventors: Kenneth M. Luther, Toledo, OH (US); Michael R. Sexsmith, Hudson, FL (US)

(73) Assignee: Parker-Hannifin Corporation, Cleveland, OH (US)

(*) Notice: Subject to any disclaimer, the term of this patent is extended or adjusted under 35 U.S.C. 154(b) by 542 days.

(21) Appl. No.: 14/375,920

(22) PCT Filed: May 18, 2012

(86) PCT No.: PCT/US2012/038474
§ 371 (c)(1),
(2), (4) Date: Jul. 31, 2014

(87) PCT Pub. No.: WO2013/115837
PCT Pub. Date: Aug. 8, 2013

(65) Prior Publication Data
US 2015/0021256 A1    Jan. 22, 2015

Related U.S. Application Data

(60) Provisional application No. 61/594,006, filed on Feb. 2, 2012.

(51) Int. Cl.
*B01D 29/13*   (2006.01)
*B01D 29/00*   (2006.01)
(Continued)

(52) U.S. Cl.
CPC ......... *B01D 29/13* (2013.01); *B01D 29/0093* (2013.01); *B01D 29/21* (2013.01);
(Continued)

(58) Field of Classification Search
CPC .... B01D 29/13; B01D 29/0093; B01D 29/21; B01D 46/2414; B01D 2201/291;
(Continued)

(56) References Cited

U.S. PATENT DOCUMENTS 3,457,339 A * 7/1969 Pall ................ B29C 65/4815
                                                              264/162
4,521,309 A * 6/1985 Pall .................... B01D 27/08
                                                              210/493.2

(Continued)

FOREIGN PATENT DOCUMENTS

DE   20 2006 011989    1/2008
WO      2008/015092    2/2008

OTHER PUBLICATIONS

International Search Report for corresponding patent application No. PCT/US2012/038474 dated Oct. 26, 2012.
(Continued)

*Primary Examiner* — Madeline Gonzalez
(74) *Attorney, Agent, or Firm* — Renner, Otto, Boisselle & Sklar, LLP (57) ABSTRACT

Provided is a filter assembly including at least one end cap and at least one retainer mechanically locked to the end cap in a cavity and defining a region into which the bonding agent can flow to form a mechanical interlock with the retainer. Even if the bonding agent does not fully adhere to the end cap, the filter media will be secured in the end cap via the mechanical interlock of the bonding agent and retainer, thereby preventing end cap separation from the element.

20 Claims, 4 Drawing Sheets

(51) Int. Cl.
*B01D 46/24* (2006.01)
*B01D 29/21* (2006.01)

(52) U.S. Cl.
CPC .... *B01D 46/2414* (2013.01); *B01D 2201/127* (2013.01); *B01D 2201/291* (2013.01); *B01D 2265/04* (2013.01); *Y10T 29/49826* (2015.01)

(58) Field of Classification Search
CPC .......... B01D 2201/127; B01D 2265/04; B01D 2201/295; Y10T 29/49826
USPC .............................. 210/233, 493.2, 450, 435
See application file for complete search history.

(56) References Cited

U.S. PATENT DOCUMENTS

| | | | |
|---|---|---|---|
| 5,381,709 | A | 1/1995 | Louw |
| 6,039,525 | A | 3/2000 | Johnson |
| 6,171,482 | B1 | 1/2001 | Nichols |
| 6,500,335 | B2 | 12/2002 | Janik et al. |
| 7,198,152 | B2 | 4/2007 | Barton et al. |
| 7,628,837 | B2 | 12/2009 | Ehrenberg |
| 2006/0196823 | A1* | 9/2006 | Desmarais ........... B01D 27/005 210/437 |
| 2008/0047891 | A1* | 2/2008 | Roesgen ................ B01D 29/21 210/236 |
| 2008/0302476 | A1 | 12/2008 | Bommi et al. |
| 2010/0148448 | A1 | 6/2010 | Pinto et al. |
| 2015/0165350 | A1 | 6/2015 | Bridges |

OTHER PUBLICATIONS

International Preliminary Report on Patentability for corresponding patent application No. PCT/US2012/038474 dated May 7, 2014.

\* cited by examiner

END CAP RETENTION DEVICE

RELATED APPLICATIONS

This application is a national phase of International Application No. PCT/US2012/038474 filed on May 18, 2012 and published in the English language, which claims the benefit of U.S. Provisional Application No. 61/594,006 filed Feb. 2, 2012, which is hereby incorporated herein by reference.

FIELD OF INVENTION

The present invention relates generally to filter assemblies, and more particularly to end caps for filter assemblies.

BACKGROUND

Filter assemblies have been employed in a variety of applications including hydraulic systems, fuel systems and engine lubrication systems. High pressure hydraulic systems, for example, require long component life and high performance standards. To accomplish the foregoing, hydraulic components are built with tight tolerances, which increase sensitivity to contamination. Filter assemblies can be used to filter out ingressed contamination before the contamination jams a valve or scores a cylinder, to block pump generated debris before it reaches servo and proportional valves in the hydraulic systems, etc.

The filter assemblies can include a filtration media such as a wire reinforced pleated filtration media. The wire reinforcement prevents the pleats from bunching, prevents media migration, and maintains media efficiency. By preventing the pleats from bunching, for example, the wire reinforcement prevent the effective surface area of the filter from being reduced and prevents excessive pressure drop.

SUMMARY OF INVENTION

The present invention provides a filter assembly including at least one end cap and at least one retainer mechanically locked to the end cap in a cavity and defining a region into which the bonding agent can flow to form a mechanical interlock with the retainer. Even if the bonding agent does not fully adhere to the end cap, the filter media will be secured in the end cap via the mechanical interlock of the bonding agent and retainer, thereby preventing end cap separation from the element.

According to one aspect of the invention, a filtration assembly is provided that includes at least one end cap having a cavity defined therein, a filter media having one end disposed in the cavity and secured to the end cap by a bonding agent, and at least one retainer mechanically locked to the end cap in the cavity and defining a region into which the bonding agent can flow to form a mechanical interlock with the retainer.

In an embodiment, the at least one retainer has a body and at least one tine projecting from the body to mechanically lock the retainer to the end cap.

In another embodiment, the at least one tine projects radially outwardly from the body and engages an inner surface of a wall of the end cap to secure the retainer to the end cap.

In yet another embodiment, the at least one retainer has a plurality of circumferentially spaced tines.

In a further embodiment, a pair of the circumferentially spaced tines, the body of the retainer, and the inner surface define respective regions into which the bonding agent can flow.

In yet a further embodiment, the body of the at least one retainer has a through-hole extending therethrough through which the bonding agent can flow.

In still another embodiment, the end cap includes an annular inner wall and an annular outer wall surrounding the inner wall, the inner and outer walls defining the cavity.

In another embodiment, the end cap includes an end wall non-parallel to the inner and outer walls and axially spaced from ends of the inner and outer walls that receive the filter media.

In yet another embodiment, the end wall is perpendicular to the inner wall and the outer wall.

In a further embodiment, the retainer is positioned in the cavity in an axially spaced relationship to the end wall, thereby defining an undercut in the cavity for receiving the bonding agent.

In yet a further embodiment, the retainer has an inner diameter that is greater than an outer diameter of the inner wall thereby defining with the inner wall a region into which the bonding agent can flow.

In still another embodiment, the end cap includes an annular inner wall and an annular outer wall surrounding the inner wall, the inner and outer walls defining the cavity.

In another embodiment, the at least one tine projects radially inwardly from the body and engages an outer surface of the inner wall of the end cap to secure the retainer to the end cap.

In yet another embodiment, the at least one retainer has a plurality of circumferentially spaced tines projecting radially inwardly from the body.

In a further embodiment, a pair of the circumferentially spaced tines, the body of the retainer, and the outer surface define respective regions into which the bonding agent can flow.

In yet a further embodiment, the retainer has an outer diameter that is less than an inner diameter of the annular outer wall thereby defining with the outer wall a region into which the bonding agent can flow.

In another embodiment, the end cap includes an end wall non-parallel to the inner and outer walls and axially spaced from ends of the inner and outer walls that receive the filter media.

In yet another embodiment, the end wall is perpendicular to the inner wall and the outer wall.

In a further embodiment, the retainer is positioned in the cavity in an axially spaced relationship to the end wall, thereby defining an undercut in the cavity for receiving the bonding agent.

In yet a further embodiment, the at least one retainer includes a plurality of circumferentially spaced tines projecting radially outwardly from the body, at least one of the tines engaging an inner surface of the outer wall and an outer surface of the inner wall to secure the retainer to the end cap.

In still another embodiment, the at least one retainer includes a plurality of retainers circumferentially arranged around cavity between the inner and outer walls.

In another embodiment, the at least one retainer includes at least two tines that bite into the inner surface of the outer wall and at least two tines that bite into the outer surface of the inner wall.

In yet another embodiment, the at least two tines that bite into the inner surface, the body of the retainer and the inner surface define a region into which the bonding agent can flow, and wherein the at least two tines that bite into the outer surface, the body of the retainer, and the outer surface define a region into which the bonding agent can flow.

In a further embodiment, the at least one retainer includes a through-hole extending therethrough that defines a region into which the bonding agent can flow.

In yet a further embodiment, the retainers are circumferentially spaced apart from one another.

In still another embodiment a region into which the bonding agent can flow is defined between adjacent retainers.

In another embodiment, the end cap includes an end wall non-parallel to the inner and outer walls and axially spaced from ends of the inner and outer walls that receive the filter media.

In yet another embodiment, the end wall is perpendicular to the inner wall and the outer wall.

In a further embodiment, the retainers are positioned in the cavity in an axially spaced relationship to the end wall, thereby defining an undercut in the cavity for receiving the bonding agent.

In yet a further embodiment, the inner wall defines a passage through the end cap for fluid In still another embodiment, the retainer has a surface facing opposite the filter media, and wherein an open space is defined behind the surface into which the bonding agent can flow.

In another embodiment, the retainer is steel.

In yet another embodiment, the filtration assembly further includes a second end cap having a cavity defined therein, and at least one retainer mechanically locked to the second end cap in the cavity and defining a region into which the bonding agent can flow to form a mechanical interlock with the retainer, wherein a second end of the filter media is disposed in the cavity and secured to the end cap by a bonding agent.

In still another embodiment, the at least one retainer has a body and at least one tine projecting from the body to mechanically lock the retainer to the second end cap.

In another embodiment, the at least one tine projects radially outwardly from the body and engages an inner surface of a wall of the second end cap to secure the retainer to the second end cap.

In yet another embodiment, the at least one retainer has a plurality of circumferentially spaced tines.

In a further embodiment, a pair of the circumferentially spaced tines, the body of the retainer, and the inner surface define respective regions into which the bonding agent can flow.

In yet a further embodiment, the body of the at least one retainer has a through-hole extending therethrough through which the bonding agent can flow.

In still another embodiment, the second end cap includes an annular inner wall and an annular outer wall surrounding the inner wall, the inner and outer walls defining the cavity.

In another embodiment, the second end cap includes an end wall non-parallel to the inner and outer walls and axially spaced from ends of the inner and outer walls that receive the filter media.

In yet another embodiment, the end wall is perpendicular to the inner wall and the outer wall.

In a further embodiment, the retainer is positioned in the cavity in an axially spaced relationship to the end wall, thereby defining an undercut in the cavity for receiving the bonding agent.

In yet a further embodiment, the retainer has an inner diameter that is greater than an outer diameter of the inner wall thereby defining with the inner wall a region into which the bonding agent can flow.

In still another embodiment, the second end cap includes an annular inner wall and an annular outer wall surrounding the inner wall, the inner and outer walls defining the cavity.

In another embodiment, the at least one tine projects radially inwardly from the body and engages an outer surface of the inner wall of the second end cap to secure the retainer to the second end cap.

In yet another embodiment, the at least one retainer has a plurality of circumferentially spaced tines projecting radially inwardly from the body.

In a further embodiment, a pair of the circumferentially spaced tines, the body of the retainer, and the outer surface define respective regions into which the bonding agent can flow.

In yet a further embodiment, the retainer has an outer diameter that is less than an inner diameter of the annular outer wall thereby defining with the outer wall a region into which the bonding agent can flow.

In another embodiment, the second end cap includes an end wall non-parallel to the inner and outer walls and axially spaced from ends of the inner and outer walls that receive the filter media.

In yet another embodiment, the end wall is perpendicular to the inner wall and the outer wall.

In a further embodiment, the retainer is positioned in the cavity in an axially spaced relationship to the end wall, thereby defining an undercut in the cavity for receiving the bonding agent.

In yet a further embodiment, the at least one retainer includes a plurality of circumferentially spaced tines projecting radially outwardly from the body, at least one of the tines engaging an inner surface of the outer wall and an outer surface of the inner wall to secure the retainer to the second end cap.

In still another embodiment, the at least one retainer includes a plurality of retainers circumferentially arranged around cavity between the inner and outer walls.

In another embodiment, the at least one retainer includes at least two tines that bite into the inner surface of the outer wall and at least two tines that bite into the outer surface of the inner wall.

In yet another embodiment, the at least two tines that bite into the inner surface, the body of the retainer and the inner surface define a region into which the bonding agent can flow, and wherein the at least two tines that bite into the outer surface, the body of the retainer, and the outer surface define a region into which the bonding agent can flow.

In a further embodiment, the at least one retainer includes a through-hole extending therethrough that defines a region into which the bonding agent can flow.

In yet a further embodiment, the retainers are circumferentially spaced apart from one another.

In still another embodiment a region into which the bonding agent can flow is defined between adjacent retainers.

In another embodiment, the second end cap includes an end wall non-parallel to the inner and outer walls and axially spaced from ends of the inner and outer walls that receive the filter media.

In yet another embodiment, the end wall is perpendicular to the inner wall and the outer wall.

In a further embodiment, the retainers are positioned in the cavity in an axially spaced relationship to the end wall, thereby defining an undercut in the cavity for receiving the bonding agent.

In yet a further embodiment, the inner wall defines a passage through the second end cap for fluid In still another embodiment, the retainer has a surface facing opposite the filter media, and wherein an open space is defined behind the surface into which the bonding agent can flow.

In another embodiment, the retainer is steel.

According to another aspect of the invention, a method of forming a filtration assembly is provided, the filtration assembly including top and bottom end caps having respective cavities for receiving ends of a filter media secured to the end caps by a bonding agent. The method including inserting at least one retainer in each cavity, introducing a bonding agent into each cavity, and inserting the ends of the filter media into the respective cavities, wherein the retainers are mechanically locked to the respective end cap in the respective cavity and define a region into which the bonding agent can flow to form a mechanical interlock with the retainer.

The foregoing and other features of the invention are hereinafter described in greater detail with reference to the accompanying drawings.

DETAILED DESCRIPTION

The principles of the present application have particular application to filtration assemblies for hydraulic systems, for example for aircrafts, construction equipment, etc., and thus will be described below chiefly in this context. It will of course be appreciated, and also understood, that the principles of the invention may be useful in other applications where filtration of contamination from fluid is desired.

Figure 1:
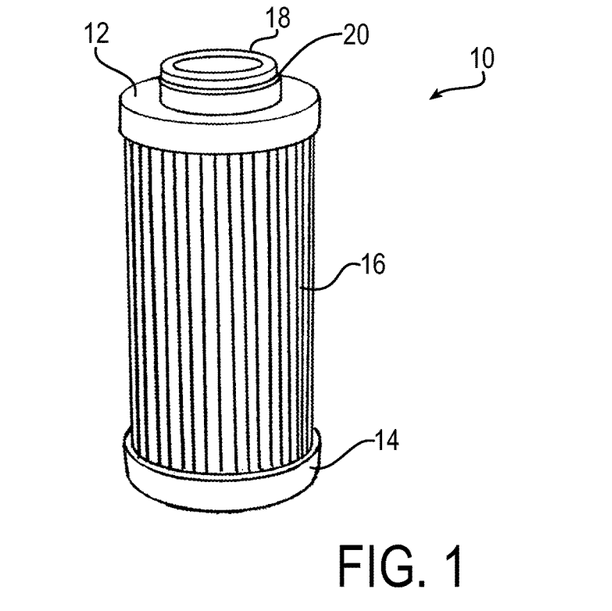
FIG. 1 is a perspective view of an exemplary filtration assembly.

Turning now to FIG. 1, a filtration assembly is shown at reference numeral 10. The filtration assembly includes top and bottom end caps 12 and 14 having respective cavities for receiving ends of a filter media 16. The ends of the filter media may be secured in the cavities by a bonding agent, thereby providing a positive retention through adhesion. The filter media may be any suitable media, such as a wire reinforced pleated filter media, and the bonding agent may be any suitable bonding agent, such as an adhesive. The top end cap 12 has a flange 18 having a groove that receives a suitable seal 20, such as an o-ring, to provide positive sealing of the end cap to an adjacent component, such as a filter head. The top end cap 12 may also include a coupling portion, such as threads, to couple to the filter head.

The filtration assembly 10 may be replaced by a filtration assembly 28 according to the present invention, but it will be appreciated that the foregoing description of the filtration assembly 10 is equally applicable to the filtration assembly 28 except as noted below. The filtration assembly 28 includes first and second end caps having respective cavities that receive ends of the filter media 16.

Figure 2:
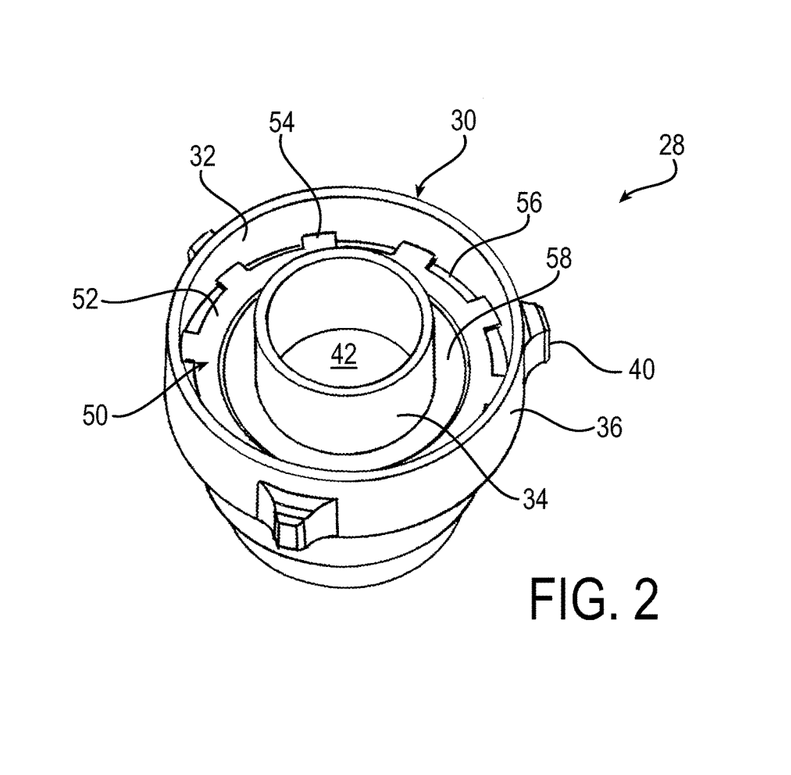
FIG. 2 is a perspective view of an exemplary end cap assembly in accordance with the invention.
Figure 3:
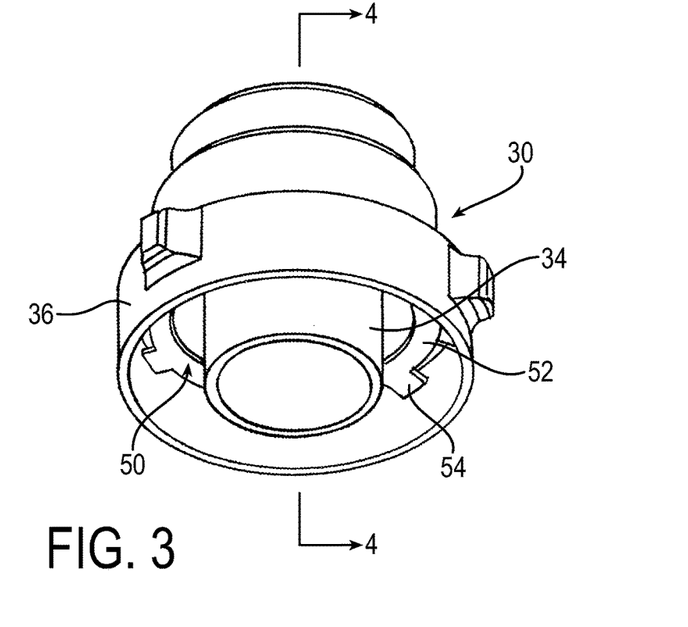
FIG. 3 is another perspective view of the exemplary end cap assembly in accordance with the invention.
Figure 4:
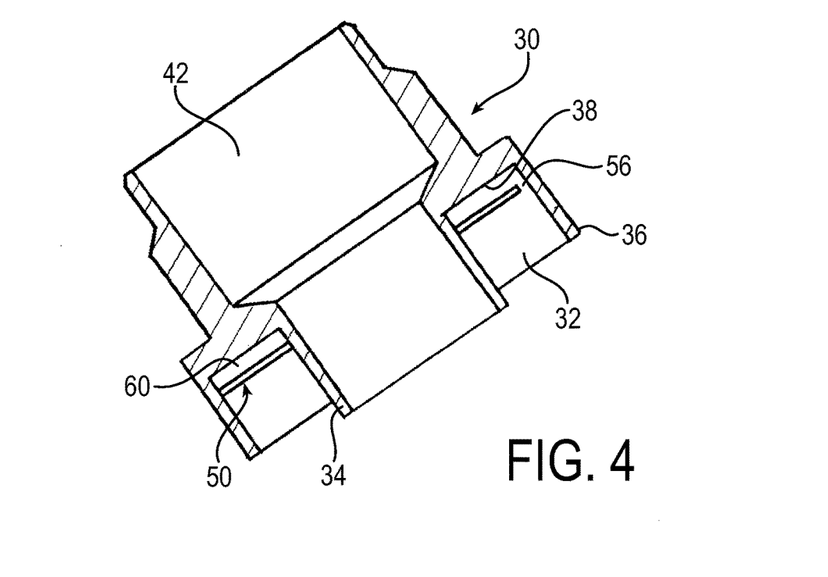
FIG. 4 is a cross-sectional view of the exemplary end cap assembly of FIG. 3 taken about line 4-4.

Referring now to FIGS. 2-4, an end cap 30 of the filtration assembly 28, which may replace one or both of the end caps 12 and 14, has a cavity 32 for receiving an end of the filter media 16, an inner wall 34, and an outer wall 36 surrounding the inner wall and spaced therefrom to define the cavity. As shown, the inner and outer walls are annular walls that are concentrically arranged, although it will be appreciated that the walls may be arranged in any suitable manner and may be any suitable shape. The end cap also includes an end wall 38 non-parallel to the inner and outer walls 34 and 36, and in the illustrated embodiment perpendicular to the inner and outer walls, and axially spaced from the ends of the walls adjacent the filter media to define an end wall of the cavity. The end cap may be any suitable material, such as plastic, and may be formed in any suitable manner, such as injection molding.

The end cap 30 may be formed with a groove or the like, as shown in FIG. 1, which receives a seal 20 to seal the end cap to a filter head. The end cap 30 can also include one or more tangs 40 on an outer surface of the outer wall. The one or more tangs provide grip for an operator when securing the end cap to the filter media.

As best shown in FIG. 4, the inner wall 34 defines a passage 42 through the end cap for fluid, such as air or hydraulic fluid, to flow through the end cap. If the filtration assembly is an outside-in assembly, fluid flows from outside the filter media 16, through the filter media and out through the passage 42. If the filtration assembly is an inside-out assembly, fluid flows through the passage 42 in a top and/or bottom end cap, to an interior portion of the filter media 16 and then out through the filter media. In some applications, the filter media may be surrounded by a cylinder that prevents the filter media from being blown radially outwardly by internal pressure. The internal pressure will also attempt to separate the end caps from the filter element.

To prevent separation, at least one retainer 50 is provided that is mechanically locked to the end cap in the cavity and that defines a region into which the bonding agent that secures the filter media 16 can flow to form a mechanical interlock with the retainer. The retainer 50 may be any suitable material, such as steel and may have any suitable shape, such as a ring, a spool with a flange providing the mechanical lock and a flange providing the mechanical interlock, etc. The retainer 50 has a body 52 and at least one tine 54, which may be for example resilient or stiff, and in the illustrated embodiment a plurality of circumferentially spaced tines, projecting from the body to mechanically lock the retainer to the end cap. The tines project radially outwardly from the body and engage an inner surface of the outer wall 36 of the end cap 30 to secure the retainer to the end cap. Specifically, the tines 54 bite into the inner surface of the outer wall 36 to prevent twisting of the retainer.

Each tine 54 defines with an adjacent tine, the body 52 and the inner surface of the outer wall a region 56 into which the bonding agent can flow. The retainer 50 also has a through-hole extending therethrough, which defines with the inner wall 34 a region 58 into which the bonding agent can flow. As shown in FIG. 4, the retainer 50 has a surface facing opposite the filter media, and an open space is defined behind the surface into which the bonding agent can flow. For example, the retainer 50 may be positioned in the cavity 32 in an axially spaced relationship to the end wall 38, thereby defining an undercut 60 in the cavity.

When the bonding agent is introduced into the cavity, the bonding agent flows through the regions 56 and 58 and into the undercut 60 and at least partially fills the cavity 132 such that the retainer 50 is at least partially surrounded by the bonding agent. When the bonding agent cures, the bonding agent is mechanically locked in the undercut 60 to resist failure in tension and mechanically locked in the regions 56 and 68 to resist failure in torsion. Thereby, even if the bonding agent does not fully adhere to the end cap, the filter media will be secured in the end cap via the mechanical interlock of the bonding agent and retainer. This may occur, for example, when the end cap is made of plastic and when the retainer is made of steel, which has a higher surface tension than most plastics.

As should be appreciated, by providing the retainer 50 in the end cap 30, the end cap does not need undercuts machined into the end cap to resist tension failures. This reduces the cost of producing the end caps and reduces the amount of machining required. Providing the retainer 50 in the end cap 30 also allows for an end cap to be used that has walls that are too thin to have undercuts machined into the walls, and allows for a larger locking surface than with an undercut machined into an end cap.

Figure 5:
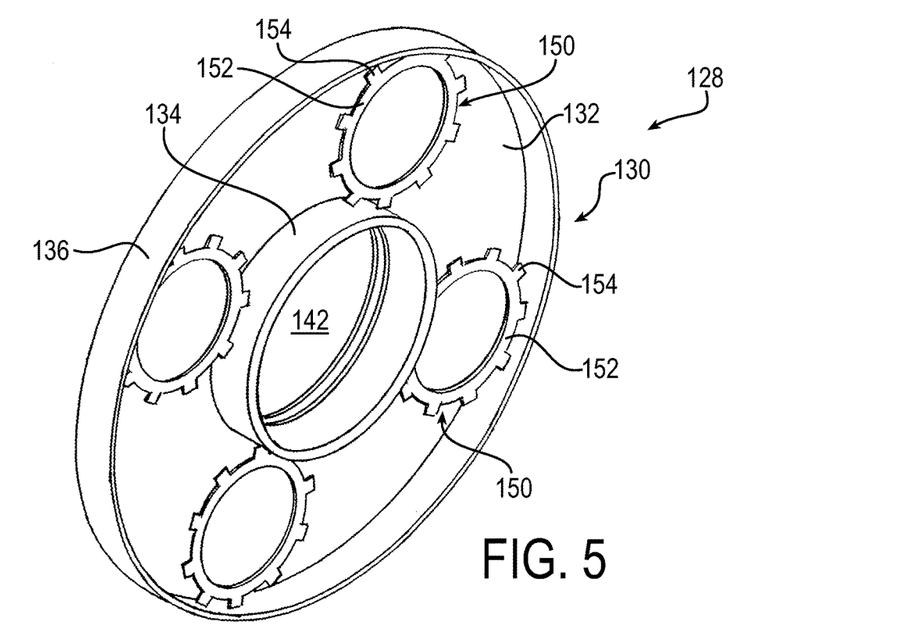
FIG. 5 is a perspective view of another exemplary end cap assembly in accordance with the invention.
Figure 6:
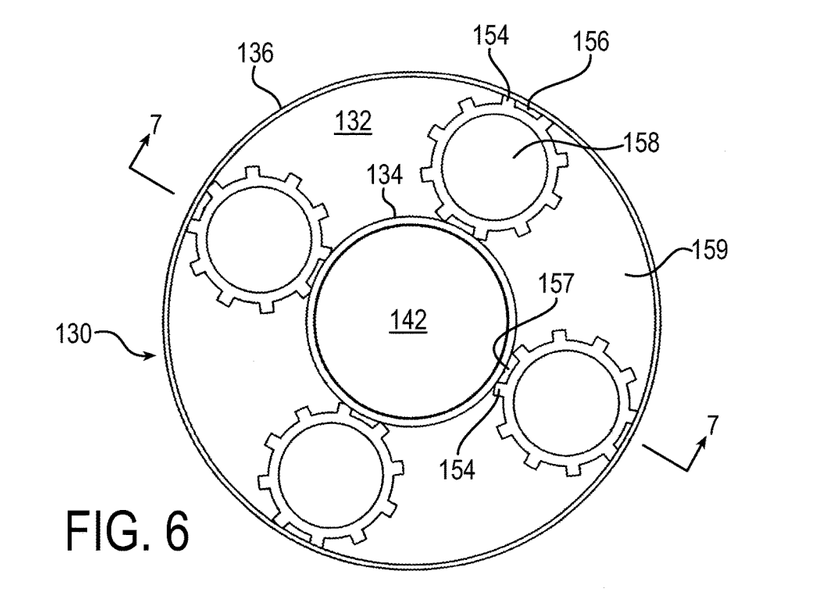
FIG. 6 is a front view of the exemplary end cap assembly of FIG. 5.
Figure 7:
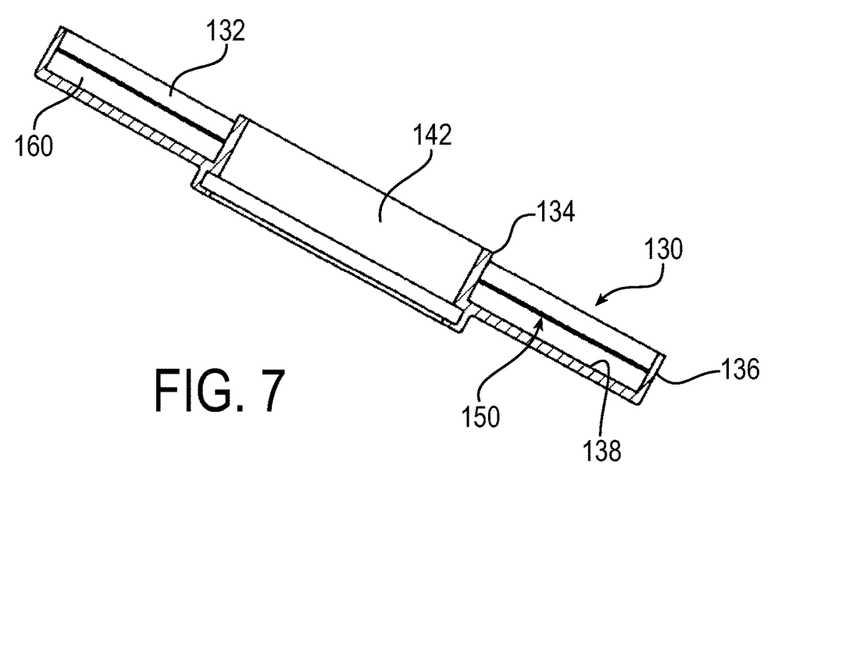
FIG. 7 is a cross-sectional view of the exemplary end cap assembly of FIG. 6 taken about line 7-7.

Turning now to FIGS. 5-7, an exemplary embodiment of the filtration assembly is shown at 128. The filtration assembly 128 is substantially the same as the above-referenced filtration assembly 28, and consequently the same reference numerals but indexed by 100 are used to denote structures corresponding to similar structures in the filtration assemblies. In addition, the foregoing description of the filtration assembly 28 is equally applicable to the filtration assembly 128 except as noted below.

Referring now to FIGS. 5-7, an end cap 130 of the filtration assembly 128 has a cavity 132 for receiving an end of the filter media 16, an inner wall 134, and an outer wall 136 surrounding the inner wall and spaced therefrom to define the cavity. The end cap also includes an end wall 138 non-parallel to the inner and outer walls 134 and 136, and in the illustrated embodiment perpendicular to the inner and outer walls, and axially spaced from the ends of the walls adjacent the filter media to define an end wall of the cavity. The end wall 138 is shown as the outer wall of the end cap, similar to the end cap 14 of FIG. 1, but it will be appreciated that the end cap 130 may be provided with a flanged portion extending past the end wall 138 for coupling to a filter head as shown in FIGS. 2-4. It will also be appreciated that the filtration assemblies may include ends caps having any suitable shape. For example, a filtration assembly may include a top end cap shaped like the end cap 30 and a bottom end cap shaped like the end cap 130, a top end cap shaped like the end cap 130 and a bottom end cap shaped like the end cap 30, top and bottom end caps shaped like either of the end caps 30 or 130, etc.

To prevent separation of the end caps from the filter media, a plurality of retainers 150 are provided that are mechanically locked to the end cap in the cavity and that define a region into which the bonding agent that secures the filter media 16 can flow to form a mechanical interlock with the retainer. The retainers 150 are circumferentially arranged around the cavity 132 between the inner wall 134 and the outer wall 136. The retainers 150 each have a body 152 and at least one tine 154, and in the illustrated embodiment a plurality of circumferentially spaced tines, projecting from the body to mechanically lock the retainer to the end cap. The tines project radially outwardly from the body and at least one tine engages an inner surface of the outer wall 136 of the end cap 130 and at least one tine engages an outer surface of the inner wall 134 to secure the retainer to the end cap.

As illustrated, each retainer 150 has two tines 154 that bite into the inner surface of the outer wall 136 and two tines that bite into the outer surface of the inner wall 134, although it will be appreciated that any suitable number of retainers may bite into the walls. The tines 154 that bite into the outer wall define with one another, the body 152 and the inner surface of the outer wall a region 156 into which the bonding agent can flow. Similarly, the tines 154 that bite into the inner wall define with one another, the body 152 and the outer surface of the inner wall a region 157 into which the bonding agent can flow. The retainers 150 also include through-holes extending therethrough that provide a region 158 into which the bonding agent can flow As shown in FIG. 7, the retainers 150 have a surface facing opposite the filter media, and open spaces are defined behind the surfaces into which the bonding agent can flow. For example, the retainer 150 may be positioned in the cavity 132 in an axially spaced relationship to the end wall 138, thereby defining an undercut 160 in the cavity. When the bonding agent is introduced into the cavity, the bonding agent flows through the regions 156, 157 and 158, as well as into regions 159 between the retainers 150, and into the undercut 160 to surround both sides of the retainers to mechanically interlock the bonding agent with the retainers.

Figure 8:
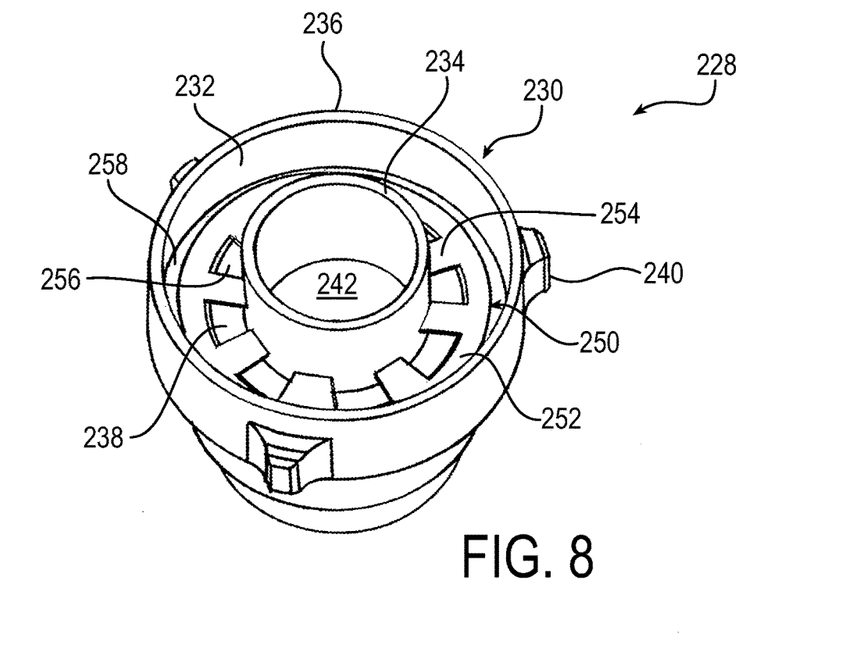
FIG. 8 is a perspective view of still another exemplary end cap assembly in accordance with the invention.

Turning now to FIG. 8, an exemplary embodiment of the filtration assembly is shown at 228. The filtration assembly 228 is substantially the same as the above-referenced filtration assembly 28, and consequently the same reference numerals but indexed by 200 are used to denote structures corresponding to similar structures in the filtration assemblies. In addition, the foregoing description of the filtration assembly 28 is equally applicable to the filtration assembly 228 except as noted below.

Referring now to FIG. 8, an end cap 230 of the filtration assembly 228 has a cavity 232 for receiving an end of the filter media 16, an inner wall 234, and an outer wall 236 surrounding the inner wall and spaced therefrom to define the cavity. The end cap also includes an end wall 38 non-parallel to the inner and outer walls 34 and 36, and in the illustrated embodiment perpendicular to the inner and outer walls, and axially spaced from the ends of the walls adjacent the filter media to define an end wall of the cavity.

To prevent separation of the end caps from the filter media, at least one retainer 250 is provided that is mechanically locked to the end cap 230 in the cavity and that defines a region into which the bonding agent that secures the filter media 16 can flow to form a mechanical interlock with the retainer. The retainer 250 has a body 252 and at least one tine 254, and in the illustrated embodiment a plurality of circumferentially spaced tines, projecting from the body to mechanically lock the retainer to the end cap. The tines project radially inwardly from the body and engage an outer surface of the inner wall 234 of the end cap 230 to secure the retainer to the end cap. Each tine 254 defines with an adjacent tine, the body 252 and the outer surface of the inner wall a region 256 into which the bonding agent can flow. The retainer 250 is sized such that an outer diameter of the retainer is less than an inner diameter of the outer wall 236, thereby defining with the outer wall a region 258 into which the bonding agent can flow.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A filtration assembly including:
   at least one end cap having a cavity defined therein;
   a filter media having one end disposed in the cavity and secured to the end cap by a bonding agent; and
   at least one retainer mechanically locked to the end cap in the cavity and defining a region into which the bonding agent can flow to form a mechanical interlock with the retainer, the at least one retainer having a body and a plurality of circumferentially spaced tines projecting from the body to bite into a wall of the end cap to mechanically lock the retainer to the end cap to prevent twisting of the retainer relative to the end cap.

2. The filtration assembly according to claim 1, wherein the plurality of tines project radially outwardly from the body and engage an inner surface of the wall of the end cap to secure the retainer to the end cap.

3. The filtration assembly according to claim 2, wherein a pair of the circumferentially spaced tines, the body of the retainer, and the inner surface define respective regions into which the bonding agent can flow.

4. The filtration assembly according to claim 1, wherein the body of the at least one retainer has a through-hole extending therethrough through which the bonding agent can flow.

5. The filtration assembly according to claim 1, wherein the end cap includes an annular inner wall and an annular outer wall surrounding the inner wall, the inner and outer walls defining the cavity.

6. The filtration assembly according to claim 5, wherein the end cap includes an end wall non-parallel to the inner and outer walls and axially spaced from ends of the inner and outer walls that receive the filter media.

7. The filtration assembly according to claim 6, wherein the end wall is perpendicular to the inner wall and the outer wall.

8. The filtration assembly according to claim 6, wherein the retainer is positioned in the cavity in an axially spaced relationship to the end wall, thereby defining an undercut in the cavity for receiving the bonding agent.

9. The filtration assembly according to claim 8, wherein the retainer has an inner diameter that is greater than an outer diameter of the inner wall thereby defining with the inner wall a region into which the bonding agent can flow.

10. The filtration assembly according to claim 5, wherein the plurality of tines project radially inwardly from the body and engage an outer surface of the inner wall of the end cap to secure the retainer to the end cap.

11. The filtration assembly according to claim 10, wherein a pair of the circumferentially spaced tines, the body of the retainer, and the outer surface define respective regions into which the bonding agent can flow.

12. The filtration assembly according to claim 10, wherein the retainer has an outer diameter that is less than an inner diameter of the annular outer wall thereby defining with the outer wall a region into which the bonding agent can flow.

13. The filtration assembly according to claim 10, wherein the end cap includes an end wall non-parallel to the inner and outer walls and axially spaced from ends of the inner and outer walls that receive the filter media, and wherein the retainer is positioned in the cavity in an axially spaced relationship to the end wall, thereby defining an undercut in the cavity for receiving the bonding agent.

14. The filtration assembly according to claim 13, wherein the end wall is perpendicular to the inner wall and the outer wall.

15. The filtration assembly according to claim 5, wherein the inner wall defines a passage through the end cap for fluid.

16. The filtration assembly according to claim 1, wherein the retainer has a surface facing opposite the filter media, and wherein an open space is defined behind the surface into which the bonding agent can flow.

17. The filtration assembly according to claim 1, further comprising:
    a second end cap having a cavity defined therein; and
    at least one retainer mechanically locked to the second end cap in the cavity and defining a region into which the bonding agent can flow to form a mechanical interlock with the retainer;
    wherein a second end of the filter media is disposed in the cavity and secured to the end cap by a bonding agent.

18. The filtration assembly according to claim 1, wherein the bonding agent at least partially fills the cavity such that the at least one retainer is at least partially surrounded by the bonding agent to form the mechanical interlock.

19. A method of forming a filtration assembly including:
    top and bottom end caps having respective cavities for receiving ends of a filter media secured to the end caps by a bonding agent, the method including:
    inserting at least one retainer having a body and a plurality of circumferentially spaced tines projecting from the body in each cavity;
    introducing a bonding agent into each cavity; and
    inserting the ends of the filter media into the respective cavities;
    wherein the retainers are each mechanically locked to the respective end cap in the respective cavity by the tines biting into a wall of the respective end cap and the retainers each define a region into which the bonding agent can flow to form a mechanical interlock with the retainer.

20. A filtration assembly including:
    at least one end cap having a cavity defined therein;
    a filter media having one end disposed in the cavity and secured to the end cap by a bonding agent; and
    at least one retainer that is mechanically locked to the end cap in the cavity and defines a region into which the bonding agent can flow to form a mechanical interlock with the retainer, the region being defined by at least one through-hole that extends through the retainer to a chamber located below the at least one retainer,
    wherein the bonding agent flows through the through-hole and into the chamber located below the at least one retainer, the bonding agent at least partially filling the cavity such that the at least one retainer is at least partially surrounded by the bonding agent to form the mechanical interlock, the retainer being mechanically locked to the end cap independently of the bonding agent.

* * * * *